(12) United States Patent
Jeong

(10) Patent No.: US 12,013,460 B2
(45) Date of Patent: Jun. 18, 2024

(54) APPARATUS FOR CLUSTERING LIDAR DATA, SYSTEM HAVING THE SAME AND METHOD THEREOF

(71) Applicants: Hyundai Motor Company, Seoul (KR); Kia Motors Corporation, Seoul (KR)

(72) Inventor: Mu Gwan Jeong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 807 days.

(21) Appl. No.: 17/065,067

(22) Filed: Oct. 7, 2020

(65) Prior Publication Data

US 2021/0389463 A1   Dec. 16, 2021

(30) Foreign Application Priority Data

Jun. 10, 2020  (KR) ........................ 10-2020-0070347

(51) Int. Cl.
*G01S 17/89*   (2020.01)
*G01S 17/42*   (2006.01)
*G01S 17/931*  (2020.01)

(52) U.S. Cl.
CPC .............. *G01S 17/89* (2013.01); *G01S 17/42* (2013.01); *G01S 17/931* (2020.01)

(58) Field of Classification Search
CPC ......... G01S 17/89; G01S 17/931; G01S 17/42
See application file for complete search history.

(56) References Cited

U.S. PATENT DOCUMENTS

| | | | |
|---|---|---|---|
| 10,303,180 B1 * | 5/2019 | Prats | G05D 1/0212 |
| 10,929,711 B1 * | 2/2021 | Pfeiffer | G06N 20/00 |
| 2013/0083967 A1 * | 4/2013 | Vorobiov | G06T 7/593 382/103 |
| 2019/0279049 A1 * | 9/2019 | Doria | G06V 20/653 |
| 2020/0110158 A1 * | 4/2020 | Ecins | G05D 1/024 |
| 2020/0200907 A1 * | 6/2020 | Li | G01S 17/89 |
| 2021/0192689 A1 * | 6/2021 | Bosse | G06F 18/2135 |

* cited by examiner

*Primary Examiner* — Isam A Alsomiri
*Assistant Examiner* — Joseph C Fritchman
(74) *Attorney, Agent, or Firm* — Fox Rothschild LLP

(57) ABSTRACT

A LIDAR data clustering apparatus, a system including the same, and a method thereof are provided. The apparatus includes a processor that is configured to generate a voxel map including at least one point data based on a LIDAR and remove a road surface point from the at least one point data. The processor also clusters the at least one point data. A storage of the apparatus is configured to store data obtained by the processor and an algorithm for driving the processor.

14 Claims, 9 Drawing Sheets

APPARATUS FOR CLUSTERING LIDAR DATA, SYSTEM HAVING THE SAME AND METHOD THEREOF

CROSS-REFERENCE TO RELATED APPLICATION

This application claims priority to and benefits of Korean Patent Application No. 10-2020-0070347, filed on Jun. 10, 2020, the entire contents of which are incorporated herein by reference.

BACKGROUND (a) Field of the Disclosure

The present disclosure relates to a LIDAR data clustering apparatus, a system including the same, and a LIDAR data clustering method, and more particularly, to a post-processing technique of a road point of a sloped road.

(b) Description of the Related Art

In general, an autonomous vehicle is a vehicle capable of recognizing road and surrounding conditions by itself and capable of driving to a destination even though a driver does not manipulate an accelerator pedal, a handle, a brake, etc. A representative technique that enables autonomous driving is three-dimensional (3D) light detection and ranging (hereinafter, referred to as LiDAR or LIDAR). The LiDAR is a technique (Light Detection And Ranging) that detects an object and measures a distance by using light, and a LIDAR sensor may be configured to detect a surrounding environment as 3D data. The LiDAR is a technique for complements cameras and radars, enabling autonomous driving in a vehicle.

The LIDAR data is obtained as point data, and after removing road surface points from the obtained point data, remaining points are clustered to detect an object from clustered data. However, an existing logic for removing a road surface among LIDAR point data is difficult to remove the road surface point when a vehicle faces a slope section, and thus, object recognition is difficult near a ramp.

The above information disclosed in this section is merely for enhancement of understanding of the background of the disclosure, and therefore it may contain information that does not form the prior art that is already known in this country to a person of ordinary skill in the art.

SUMMARY

An exemplary embodiment of the present disclosure has been made in an effort to provide a LIDAR data clustering apparatus, a system including the same, and a LIDAR data clustering method, capable of clearly detecting a boundary between an object and a road by accurately removing a road surface point of a ramp from LIDAR data and then clustering it. The technical objects of the present disclosure are not limited to the objects mentioned above, and other technical objects not mentioned can be clearly understood by those skilled in the art from the description of the claims.

An exemplary embodiment of the present disclosure provides a LIDAR data clustering apparatus that may include: a processor configured to generate a voxel map having at least one point data based on a LIDAR, removing a road surface point from the at least one point data, and clustering the at least one point data; and a storage configured to store data obtained by the processor and an algorithm for driving the processor.

In an exemplary embodiment, it may be determined whether there is a voxel existing within a predetermined distance from a host vehicle among at least one voxel forming the voxel map. The processor may be configured to determine whether a number of point data of each of the at least one voxel is less than a predetermined reference number. In response to determining that a plurality of point data exists in the at least one voxel, the processor may be configured to determine whether layers of the plurality of point data coincide with each other.

Additionally, the processor may be configured to determine whether layers of point data between two adjacent voxels coincide with each other by comparing the layers of the point data between the two adjacent voxels among the at least one voxel. When there is a voxel existing within a predetermined distance from a host vehicle among the at least one voxel, and a number of point data of each of the at least one voxel is less than a predetermined reference number, the processor may be configured to exclude the corresponding voxel from clustering targets. In addition when, in the case where a plurality of point data exists in the at least one voxel, layers of the plurality of point data coincide with each other, and layers of point data between two adjacent voxels coincide with each other by comparing the layers of the point data between the two adjacent voxels among the at least one voxel, the processor may be configured to exclude a voxel having the coincided layer of the plurality of point data and two voxels having the coincided layer of the point data from the clustering targets.

An exemplary embodiment of the present disclosure provides a vehicle system that may include: a LIDAR sensor; and a LIDAR data clustering apparatus configured to generate a voxel map including at least one point data based on LIDAR data obtained from the LIDAR sensor, removing a road surface point from the at least one point data, and then clustering the at least one point data. The vehicle system may further include an autonomous driving control apparatus configured to perform autonomous driving control using a result of the clustering.

Additionally, the present disclosure provides a LIDAR data clustering method that may include: receiving at least one point data based on a LIDAR; generating a voxel map including the at least one point data: and clustering the at least one point data after removing a road surface point from the at least one point data. The generating of the voxel map may include generating at least one voxel including the at least one point data; and generating the voxel map using the at least one voxel.

The of the at least one point data may include determining whether there is a voxel existing within a predetermined distance from a host vehicle among at least one voxel constituting the voxel map. Further, the clustering of the at least one point data may further include determining whether a number of point data of each of the at least one voxel is less than a predetermined reference number. The clustering of the at least one point data may further include, when a plurality of point data exists in the at least one voxel, determining whether layers of the plurality of point data coincide with each other.

In an exemplary embodiment, the clustering of the at least one point data may include determining whether layers of point data between two adjacent voxels coincide with each other by comparing the layers of the point data between the two adjacent voxels among the at least one voxel. In addition, the clustering of the at least one point data, when there is a voxel existing within a predetermined distance from a host vehicle among the at least one voxel, and a number of point data of each of the at least one voxel is less than a predetermined reference number, may further include excluding the corresponding voxel from clustering targets.

The clustering of the at least one point data, when, in the case where a plurality of point data exists in the at least one voxel, layers of the plurality of point data coincide with each other, and layers of point data between two adjacent voxels coincide with each other by comparing the layers of the point data between the two adjacent voxels among the at least one voxel, may further include excluding a voxel having the coincided layer of the plurality of point data and two voxels having the coincided layer of the point data from the clustering targets.

According to the present technique, a boundary between an object and a road may be clearly detected by more accurately removing a road surface point of a ramp from LIDAR data and then clustering it, thereby improving autonomous driving performance. In addition, various effects that may be directly or indirectly identified through this document may be provided.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Figure 1:
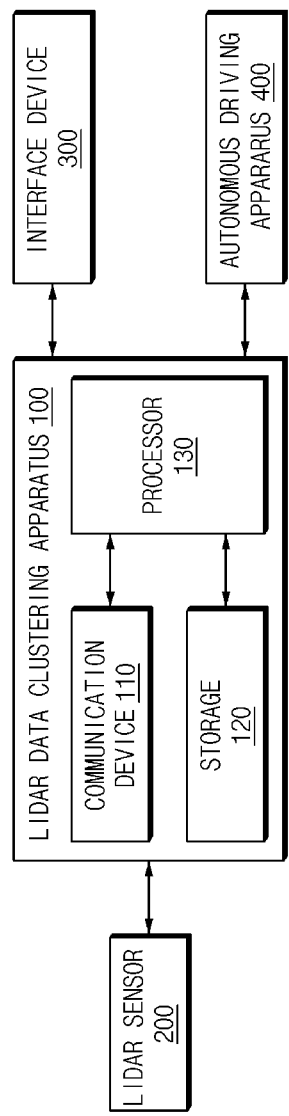
FIG. 1 illustrates a block diagram showing a configuration of a vehicle system including a LIDAR data clustering apparatus according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

The present disclosure discloses a configuration in which voxel maps are generated based on LIDAR data, to perform clustering by effectively removing a road surface point in each voxel. Hereinafter, exemplary embodiments of the present disclosure will be described in detail with reference to FIG. 1 to FIG. 9.

FIG. 1 illustrates a block diagram showing a configuration of a vehicle system including a LIDAR data clustering apparatus according to an exemplary embodiment of the present disclosure. Referring to FIG. 1, the vehicle system may include the LIDAR data clustering apparatus 100, a LIDAR sensor 200, an interface device 300, and an autonomous driving apparatus 400.

The LIDAR data clustering apparatus 100 according to the exemplary embodiment of the present disclosure may be implemented inside the vehicle. In particular, the LIDAR data clustering apparatus 100 may be integrally formed with internal control units of the vehicle, or may be implemented as a separate device to be connected to control units of the vehicle by a separate connection means. The LIDAR data clustering apparatus 100 may be configured to cluster point data of raw data outputted from the LIDAR sensor 200 to provide information of the clustered area to the autonomous driving control apparatus 400. In particular, the point data included in the raw data may include X, Y, and Z coordinates (position coordinates of objects), layer numbers (differentiating layers in voxels), and density. Accordingly, the LIDAR data clustering apparatus 100 may be configured to recognize an object based on information included in the point data.

The LIDAR data clustering apparatus 100 may be configured to perform accurate clustering after removing the road surface point from LIDAR-based point data collected from a ramp, etc., thereby enabling accurate object recognition. The LIDAR data clustering apparatus 100 may include a communication device 110, a storage 120, and a processor 130.

The communication device 110, which is a hardware device implemented with various electronic circuits to transmit and receive signals via a wireless or wired connection, may be configured to perform vehicle-to-infrastructure (V2I) communication by using an in-vehicle network communication technique or a wireless Internet access or short range communication technique with servers, infrastructure, and other vehicles outside the vehicle in the present disclosure. Herein, in-vehicle communication may be performed via controller area network (CAN) communication, local interconnect network (LIN) communication, or flex-ray communication as the in-vehicle network communication technique. In addition, the wireless communication technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like.

As an example, the communication device 110 may be configured to receive LIDAR data from the LIDAR sensor 200, and may be configured to transmit point information of a clustered object to the interface device 300 and the autonomous driving apparatus 400. The storage 120 may be configured to store LIDAR data of the LIDAR sensor 200, data acquired by the processor 130, data and/or algorithms required for the apparatus 100 to operate, and the like.

As an example, the storage 120 may be configured to store algorithms for pre-processing and post-processing of the LIDAR data, a voxel map for clustering, point information of a clustered object, and the like. The storage 120 may include a storage medium of at least one type among memories of types such as a flash memory, a hard disk, a micro, a card (e.g., an secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, may be configured to electrically operate each component, and may be an electrical circuit that executes software commands, thereby performing various data processing and calculations described below. The processor 130 may be, e.g., an electronic control unit (ECU), a micro controller unit (MCU), or other subcontrollers mounted within the vehicle.

Figure 2:
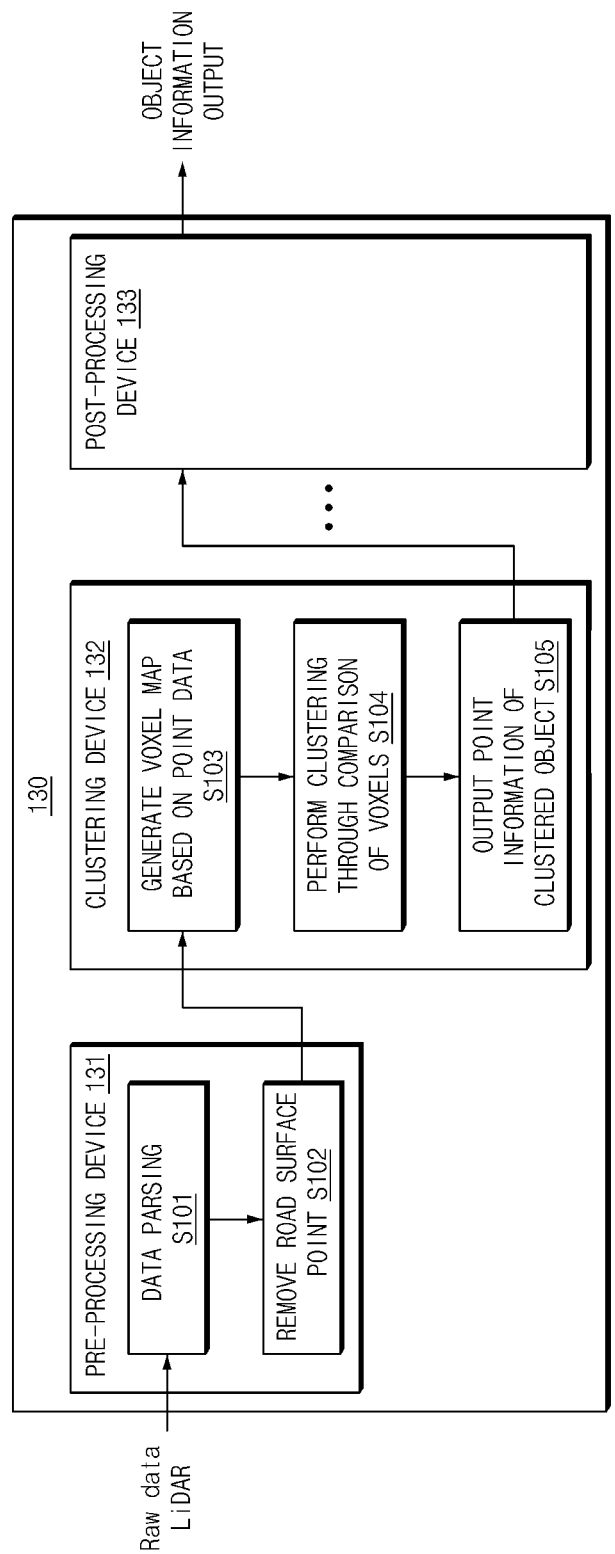
FIG. 2 illustrates a detailed configuration and an operation of a LIDAR data clustering apparatus according to an exemplary embodiment of the present disclosure.

Referring to FIG. 2, the processor 130 may include a pre-processing device 131, a clustering device 132, and a post-processing device 133. Hereinafter, operations described as being performed by the pre-processing device 131, the clustering device 132, and the post-processing device 133 are the same as those operated by the processor 130.

The pre-processing device 131 may be configured to parse through LIDAR-based raw data received from the LIDAR sensor 200 to convert the data into usable data (S101), and may be configured to remove a road surface point from point data included in the LIDAR-based raw data. In particular, a conventional technique may be used as a technique for parsing and removing road surface points, and the road surface point and the like in a sloped place may not be removed.

Figure 3:
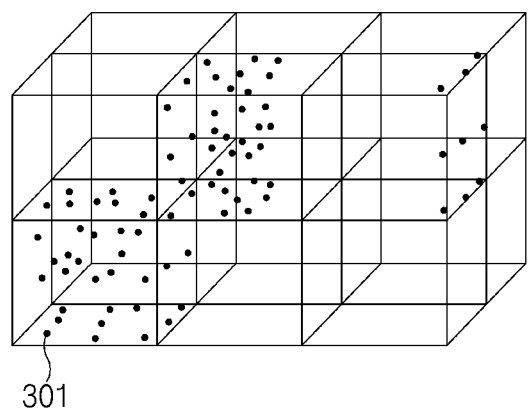
FIG. 3 illustrates an example of a screen of a voxel map based on LIDAR data according to an exemplary embodiment of the present disclosure.

The clustering device 132 may be configured to generate a voxel map as illustrated in FIG. 3 based on the point data from which the road surface point has been removed (S103). FIG. 3 illustrates an example of a screen of a voxel map based on LIDAR data according to an exemplary embodiment of the present disclosure, the voxel map may include at least one voxel, and each voxel may include at least one point data. However, there may also be a voxel that does not include point data in the voxel map.

Figure 4:
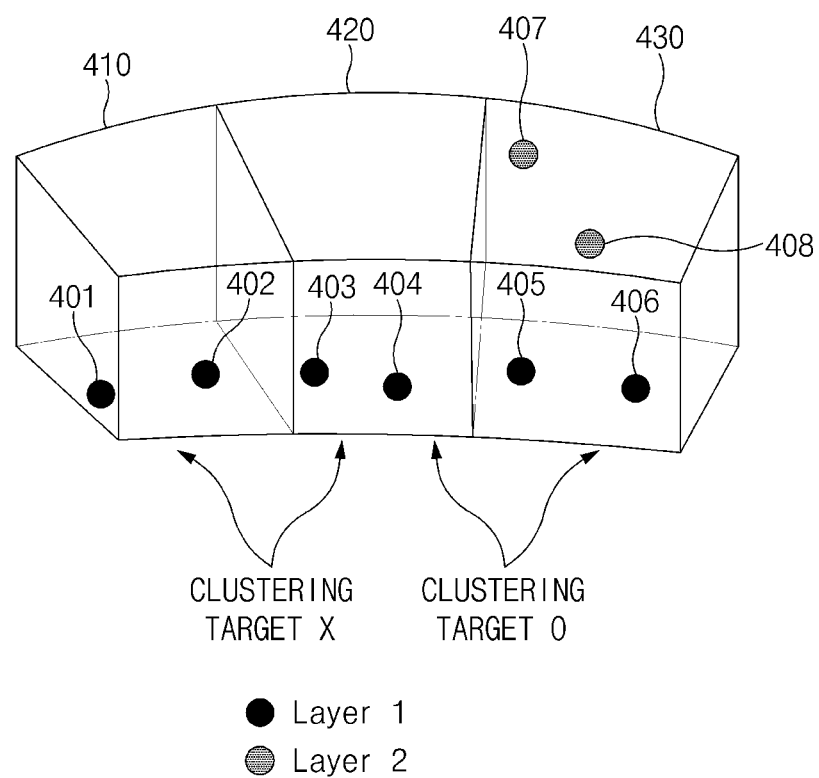
FIG. 4 illustrates an example of a screen for describing a LIDAR data clustering method according to an exemplary embodiment of the present disclosure.

Subsequently, the clustering device 132 may be configured to cluster point data by comparing adjacent voxels of the voxel map (S104). FIG. 4 illustrates an example of a screen for describing a LIDAR data clustering method according to an exemplary embodiment of the present disclosure. Referring to FIG. 4, the clustering device 132 may be configured to determine whether voxels 410, 420, and 430 are within a predetermined distance from a host vehicle, that is, within a short distance, and determine whether a number of points in each of the voxels 410, 420, and 430 is less than a predetermined number. The clustering device 132 may be configured to exclude a voxel existing within the short distance from the host vehicle and a voxel having the number of points that is less than the predetermined number from clustering targets.

When a plurality of point data exist in at least one voxel, the clustering device 132 may be configured to determine whether layers of the plurality of point data coincide with each other. In other words, the clustering device 132 may be configured to determine whether layers of the points of the voxels 410, 420, and 430 coincide with each other. For example, since points 401 and 402 of the voxel 410 are positioned in Layer 1, they are positioned in the same layer. Additionally, the drawings shows that points 403 and 404 of the voxel 420 are also positioned in Layer 1 and that points 405 and 406 of the voxel 430 are positioned in Layer 1 but points 407 and 408 are positioned in Layer 2. In other words, as in the voxels 410 and 420, when layers of internal points are the same, they may be determined as road surface points at a slope place and may be excluded from the clustering targets.

That is, a road surface point that is output as a valid point at a slope place has a feature in which points in a specific layer continuously appear, and thus when points appear continuously in a specific layer, the clustering device 132 may be configured to determine it as road surface points, and may be configured to exclude them from the clustering targets. The clustering device 132 may be configured to compare layers of point data between two adjacent voxels among at least one voxel to determine whether the layers of the point data between the two adjacent voxels coincide with each other. In other words, the clustering device 132 may be configured to determine whether the layers of the points in the voxel 410 and the voxel 420 which are adjacent to each other coincide with each other, and when they coincide with each other, may exclude the voxels from the clustering targets.

The clustering device 132 may be configured to cluster point data by excluding voxels including point data that are estimated as road surface points, to output point information in the clustered object to the post-processing device 133. In particular, the point information may be information related to an object. The post-processing device 133 may be configured to perform post-processing such as detecting an object based on point information or extracting an outline.

The LIDAR sensor 200 may be configured to emit laser pulses for detecting obstacles, roads, lanes, road surfaces, etc. positioned around the vehicle, and may provide reflected data to the device 100 as raw data. The interface device 300 may include an input for receiving a control command from a user and an output for outputting an operation state of the apparatus 100 and results thereof. Herein, the input may include a key button, and may include a mouse, a joystick, a jog shuttle, a stylus pen, and the like. In addition, the input device 250 may include a soft key implemented on the display.

The output device may include a display, and may also include a voice output such as a speaker. In particular, when a touch sensor formed of a touch film, a touch sheet, or a touch pad is provided on the display, the display may be configured to operate as a touch screen, and may be implemented in a form in which an input device and an output device are integrated. As an example, the output may be configured to output information related to an obstacle in front of the vehicle based on the LIDAR data. In particular, the display may include at least one of a liquid crystal display (LCD), a thin film transistor liquid crystal display (TFT LCD), a an organic light emitting diode display (OLED display), a flexible display, a field emission display (FED), and a 3D display.

The autonomous driving apparatus 400 may be configured to receive information related to an object clustered by the apparatus 100, and may use it for collision avoidance control or the like during autonomous driving control. In this way, according to the present disclosure, it may be possible to increase reliability of devices in the vehicle using the data by removing the road surface points of the ramp from the vowel map based on the LIDAR data to provide more accurate LIDAR data.

Figure 5:
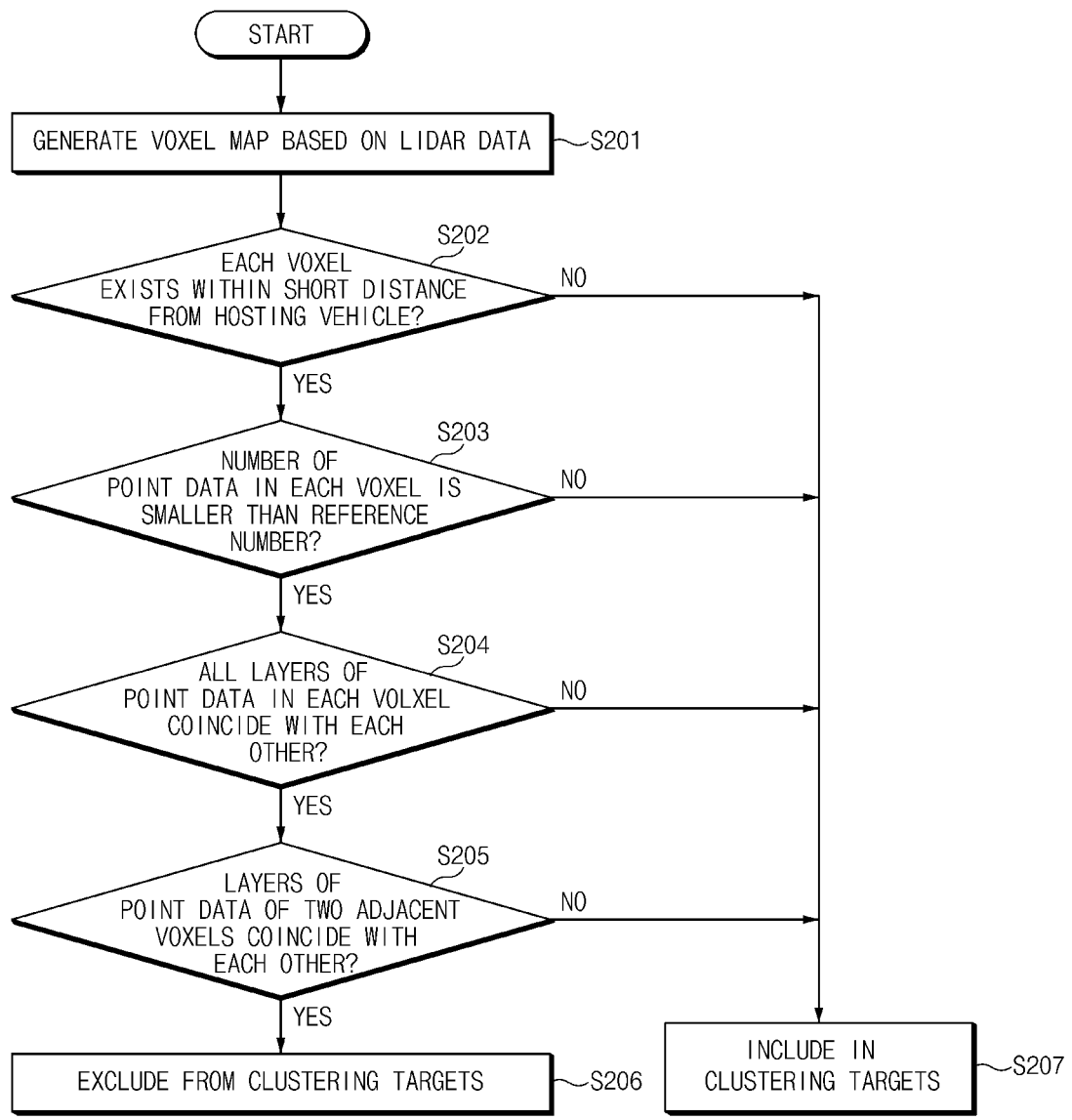
FIG. 5 illustrates a flowchart for describing a LIDAR data clustering method according to an exemplary embodiment of the present disclosure.

Hereinafter, a LIDAR data clustering method according to an exemplary embodiment of the present disclosure will be described in detail with reference to FIG. 5. FIG. 5 illustrates a flowchart for describing a LIDAR data clustering method according to an exemplary embodiment of the present disclosure. Hereinafter, it is assumed that the LIDAR data clustering apparatus 100 of the of FIG. 1 performs processes of FIG. 5. In addition, in the description of FIG. 5, operations described as being performed by a device may be understood as being controlled by the processor 130 of the LIDAR data clustering apparatus 100.

Referring to FIG. 5, the LIDAR data clustering apparatus 100 may be configured to generate a voxel map based on the LIDAR data (S201). In particular, the voxel map may include a plurality of voxels, and point data is present in each of the voxels. The LIDAR data clustering apparatus 100 may be configured to determine whether each voxel of the voxel map is positioned within a predetermined distance from a host vehicle (S202). In other words, the apparatus 100 may be configured to determine whether each voxel is positioned at a short distance from the own vehicle. This is because there is a high possibility that a road surface point is included in the voxel positioned at the short distance from the host vehicle.

The LIDAR data clustering apparatus 100 may be configured to determine whether a number of point data in each voxel is less than a predetermined reference number (S203). This is to exclude a voxel having the number of point data that is less than the predetermined reference number. The LIDAR data clustering apparatus 100 may be configured to determine whether layers of the voxels having points all coincide with each other (S204). In other words, the apparatus 100 may be configured to determine whether a plurality of point data existing in one voxel is in a same layer or different layers, and when they exist in the same layer, the point data of the corresponding voxel may be determined as road surface points.

The LIDAR data clustering apparatus 100 may be configured to determine whether layers of points of two adjacent voxels coincide with (S205). In other words, when a layer of points of a first voxel is a first layer and a layer of points of a second voxel that is adjacent thereto is the first layer, the apparatus 100 may be configured to determine that the layers of the points of the two voxels coincide with each other, and as such, when the layers of the points of the two voxels coincide with each other, may be configured to determine the points as road surface points and exclude them from the clustering targets.

In steps S202 to S205, when each voxel is within a short distance from the host vehicle, a number of each voxel point data is less than a reference number, all layers of point data in each voxel coincide with each other, and layers of point data of two voxels coincide with each other, the LIDAR data clustering apparatus 100 may be configured to perform clustering of the point data after excluding the corresponding voxel from the clustering targets (S206). For example, an area where vehicles capable of driving in the target environment of the system are detected at 3-4 layers or more is set as the short distance. The short distance may change depending on a sensor specifications (for example, sensor resolution, scan pattern, layer numbering standards, etc.)

On the other hands, in steps S202 to S205, when each voxel is not within the short distance from the host vehicle, the number of each voxel point data is equal to or greater than the reference number, all layers of point data in each voxel do not coincide with each other, and layers of point data of two voxels do not coincide with each other, the LIDAR data clustering apparatus 100 may be configured to perform the clustering of the point data after including the corresponding voxel from the clustering targets (S207).

As described above, according to the present disclosure, an obstacle (object) and a road surface may be more accurately separated to recognize an object by effectively removing unnecessary road points included in LIDAR data when a vehicle is driving near a ramp, thereby improving performance of the autonomous driving apparatus that performs autonomous driving control by using an object recognition result. In addition, it may be possible to the present disclosure, the performance of the autonomous driving apparatus may be improved since it may be possible to more accurately check borders (guardrails, bushes, etc.) of roads that are unable to be checked when a road surface is not removed well.

Figure 6:
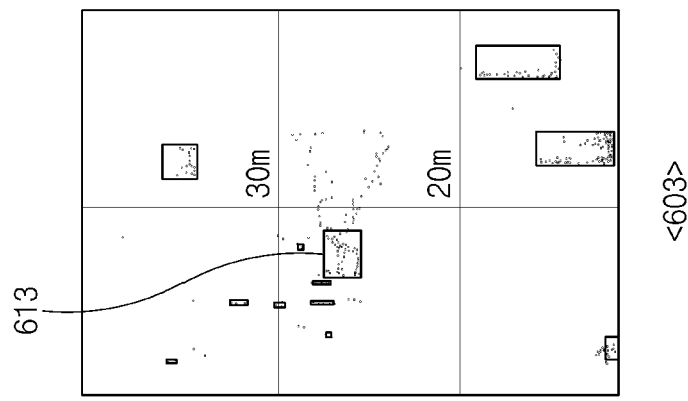
FIG. 6 to FIG. 8 illustrate examples of screens to which a LIDAR data clustering method is applied according to an exemplary embodiment of the present disclosure.
Figure 6:
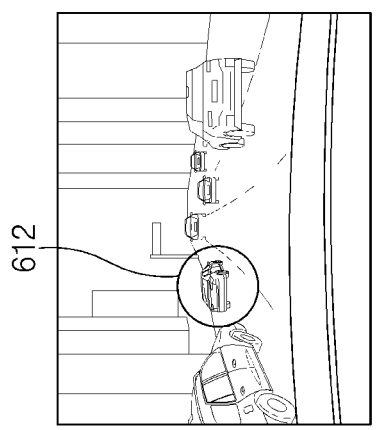
Figure 6:
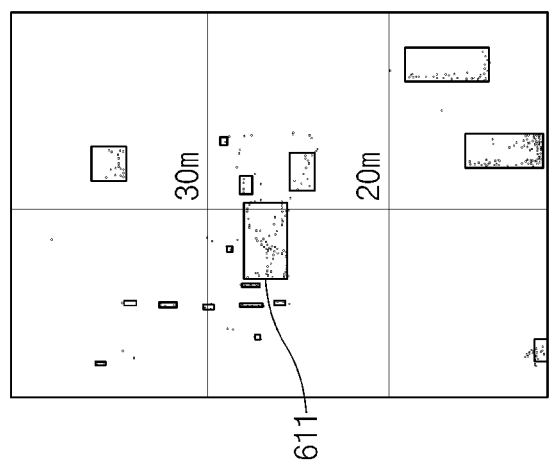
Figure 7:
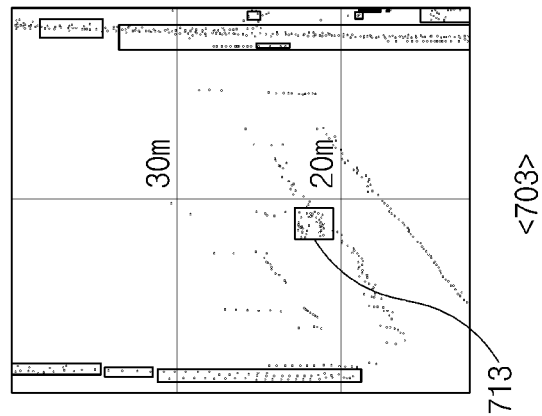
Figure 7:
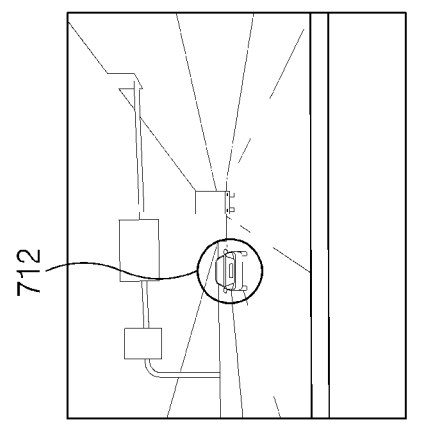
Figure 7:
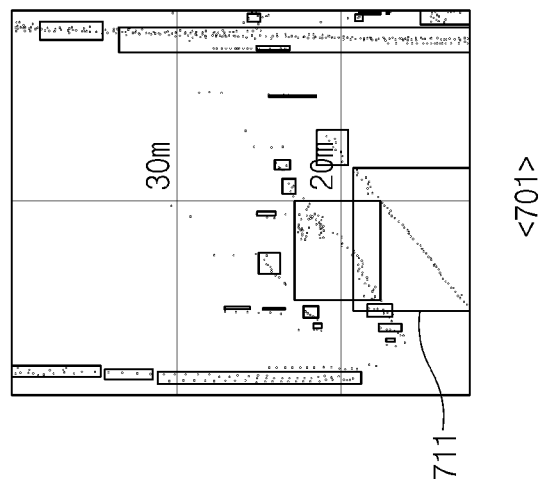
Figure 8:
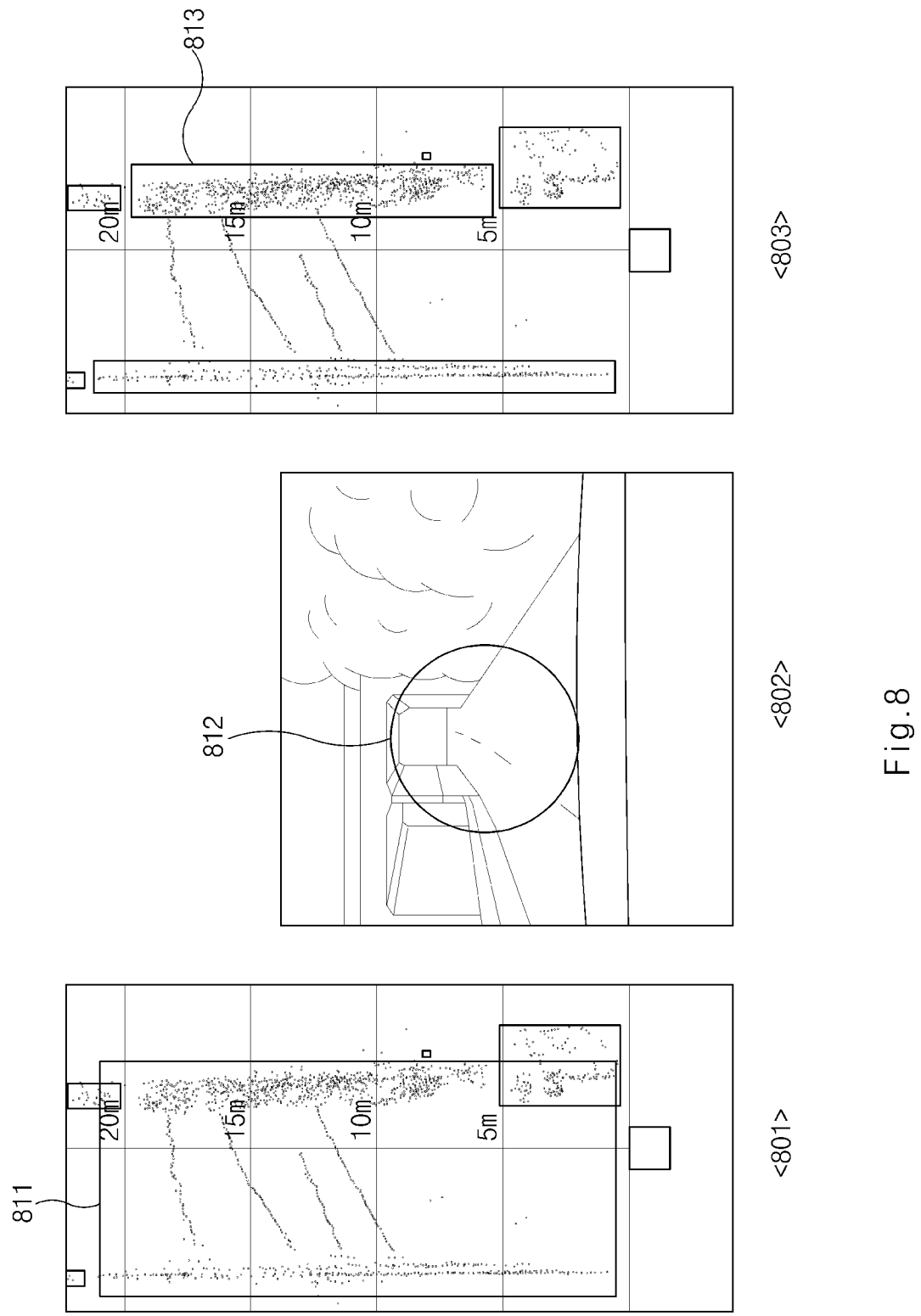

FIG. 6 to FIG. 8 illustrate examples of screens to which a LIDAR data clustering method is applied according to an exemplary embodiment of the present disclosure. FIG. 6 illustrates an example of removing road surface points of LIDAR data when driving is performed on a sloped road according to an exemplary embodiment of the present disclosure. A reference numeral 601 of FIG. 6 indicates an example of a screen in which clustering is performed in a state where road surface points are not excluded, a reference numeral 602 in FIG. 6 indicates a camera image of a clustered front side of the screen 601, and a reference numeral 603 of FIG. 6 indicates an example of a screen that is clustered by applying a logic removing the road surface points according to the present disclosure.

Referring to the screen 601 of FIG. 6, the road surface is not removed well since the road has a slope based on a vehicle forward direction, and thus a clustered object 611 is much larger than an actual object 612. Accordingly, the autonomous driving apparatus 400 may incorrectly recognize the clustered object 611 as an object other than the vehicle. Referring to the screen 603 of FIG. 6, a size of an object 613 that is clustered after the road surface points are removed is reduced, and thus the autonomous driving apparatus 400 increases possibility of recognizing the clustered object 613 as a vehicle.

FIG. 7 illustrates a view for describing clustering performed on a curved surface of a road according to an exemplary embodiment of the present disclosure. A reference numeral 701 of FIG. 7 indicates an example of a screen in which clustering is performed in a state where road surface points are not excluded, a reference numeral 702 in FIG. 7 indicates a camera image of a clustered front of the screen 701, and a reference numeral 703 indicates an example of a screen that is clustered by applying a logic removing the road surface points according to the present disclosure.

Referring to the screen 701 of FIG. 7, the road surface points may not be removed well due to the curved surface of the road to cluster an object 711 to be larger than an object 712 that is clustered including the road surface points and photographed by a camera, and thus, the autonomous driving apparatus 400 may be incorrectly recognized as an object other than the vehicle. Referring to the screen 703 of FIG. 7, a size of an object 713 that is clustered by clustering only the point data for the vehicle after the road surface points are removed is reduced, and thus the autonomous driving apparatus 400 increases possibility of recognizing the clustered object 713 as a vehicle.

FIG. 8 illustrates an example in which a road boundary and a road are clustered together according to an exemplary embodiment of the present disclosure. A reference numeral 801 of FIG. 8 indicates an example of a screen in which clustering is performed in a state where road surface points are not excluded, a reference numeral 802 in FIG. 8 indicates a camera image of a clustered front of the screen 801, and a reference numeral 803 of FIG. 8 indicates an example of a screen that is clustered by applying a logic removing the road surface points according to the present disclosure.

The screen 801 of FIG. 8 shows that it is not easy to check road boundary information due to left and right road borders and a road surface of a road on which vehicles are driving are clustered together. In other words, the drawings shows that it may be difficult to check the road boundary information due to an object 811 that is clustered together with a road surface as well as a road boundary 812 photographed by a camera. Additionally, the screen 803 of FIG. 8 shows that the right and left road borders are displayed more accurately as only road boundaries are clustered by removing road surface points.

Figure 9:
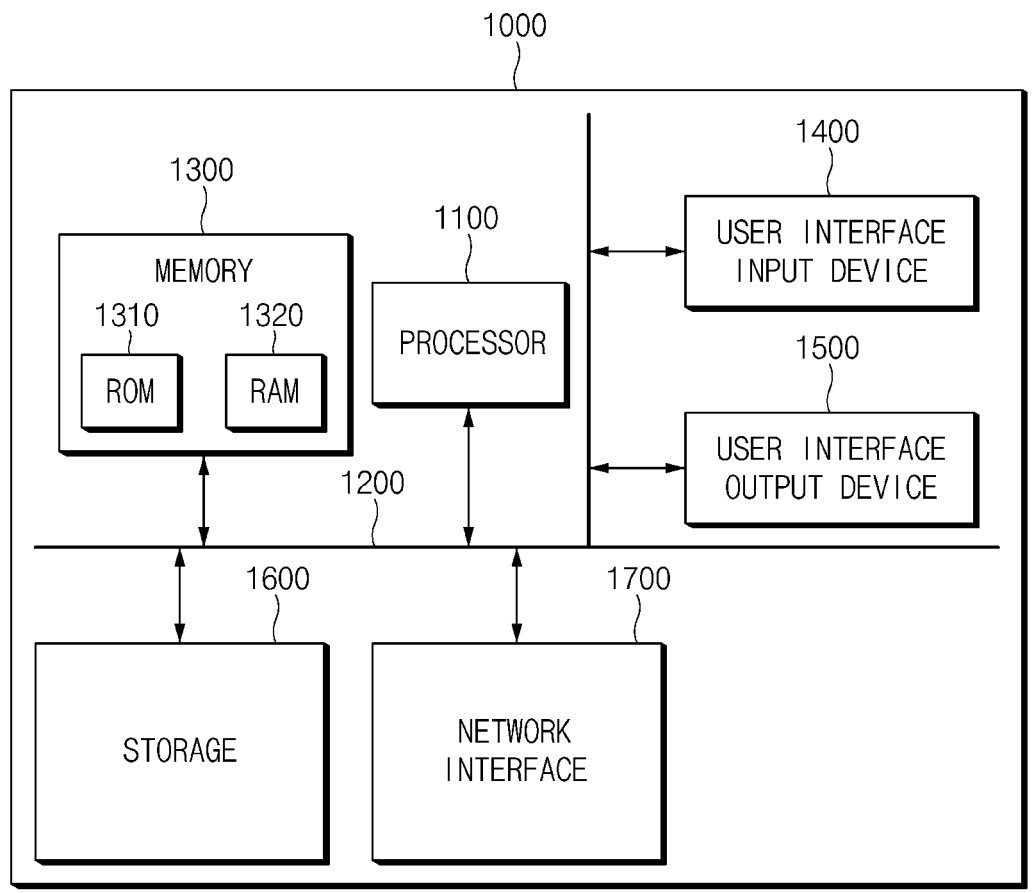
FIG. 9 illustrates a computing system according to an exemplary embodiment of the present disclosure.

FIG. 9 illustrates a computing system according to an exemplary embodiment of the present disclosure. Referring to FIG. 9, via computing system 1000 may include at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device configured to perform processing on commands stored in the memory 1300 and/or the storage 1600. The memory 1300 and the storage 1600 may include various types of volatile or nonvolatile storage media. For example, the memory 1300 may include a read only memory (ROM) and a random access memory (RAM). Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, a EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A LIDAR data clustering apparatus, comprising:
   a processor configured to generate a voxel map including at least one point data based on a LIDAR, removing a road surface point from the at least one point data, and then clustering the at least one point data; and
   a storage configured to store data obtained by the processor and an algorithm for driving the processor,
   wherein when a plurality of point data exists in at least one voxel constituting the voxel map, the processor is configured to determine whether layers of the plurality of point data coincide with each other on a layer-by-layer basis, and wherein the processor is configured to remove the road surface point included in the at least one voxel upon determining that the plurality of point data in at least one layer coincide with each other.

2. The LIDAR data clustering apparatus of claim 1, wherein the processor is configured to determine whether there is a voxel existing within a predetermined distance from a host vehicle among the at least one voxel constituting the voxel map.

3. The LIDAR data clustering apparatus of claim 2, wherein the processor is configured to determine whether a number of point data of each of the at least one voxel is smaller than a predetermined reference number.

4. The LIDAR data clustering apparatus of claim 1, wherein the processor is configured to determine whether layers of point data between two adjacent voxels coincide with each other by comparing the layers of the point data between the two adjacent voxels among the at least one voxel.

5. The LIDAR data clustering apparatus of claim 4, wherein when there is a voxel existing within a predetermined distance from a host vehicle among the at least one voxel, and a number of point data of each of the at least one voxel is less than a predetermined reference number, the processor is configured to exclude the corresponding voxel from clustering targets.

6. The LIDAR data clustering apparatus of claim 5, wherein when a plurality of point data exist in the at least one voxel, layers of the plurality of point data coincide with each other, and layers of point data between two adjacent voxels coincide with each other by comparing the layers of the point data between the two adjacent voxels among the at least one voxel, the processor is configured to exclude a voxel having the coincided layer of the plurality of point data and two voxels having the coincided layer of the point data from the clustering targets.

7. The LIDAR data clustering apparatus of claim 1, further comprising:
a LIDAR sensor.

8. A LIDAR data clustering method, comprising:
receiving, by a processor, at least one point data based on a LIDAR;
generating, by the processor, a voxel map including the at least one point data; and
clustering, by the processor, the at least one point data after removing a road surface point from the at least one point data,
wherein the clustering of the at least one point data further includes, when a plurality of point data exists in at least one voxel forming the voxel map, determining, by the processor, whether layers of the plurality of point data coincide with each other on a layer-by-layer basis, and
wherein the processor is configured to remove the road surface point included in the at least one voxel upon determining that the plurality of point data in at least one layer coincide with each other.

9. The LIDAR data clustering method of claim 8, wherein the generating of the voxel map includes generating, by the processor, the at least one voxel including the at least one point data; and generating, by the processor, the voxel map by using the at least one voxel.

10. The LIDAR data clustering method of claim 8, wherein the clustering of the at least one point data includes determining, by the processor, whether there is a voxel existing within a predetermined distance from a host vehicle among the at least one voxel forming the voxel map.

11. The LIDAR data clustering method of claim 10, wherein the clustering of the at least one point data further includes determining, by the processor, whether a number of point data of each of the at least one voxel is less than a predetermined reference number.

12. The LIDAR data clustering method of claim 8, wherein the clustering of the at least one point data further includes, determining, by the processor, whether layers of point data between two adjacent voxels coincide with each other by comparing the layers of the point data between the two adjacent voxels among the at least one voxel.

13. The LIDAR data clustering method of claim 12, wherein the clustering of the at least one point data further includes, when there is a voxel existing within a predetermined distance from a host vehicle among the at least one voxel, and a number of point data of each of the at least one voxel is less than a predetermined reference number, excluding, by the processor, the corresponding voxel from clustering targets.

14. The LIDAR data clustering method of claim 13, wherein the clustering of the at least one point data, when a plurality of point data exist in the at least one voxel, layers of the plurality of point data coincide with each other, and layers of point data between two adjacent voxels coincide with each other by comparing the layers of the point data between the two adjacent voxels among the at least one voxel, further includes excluding, by the processor, a voxel having the coincided layer of the plurality of point data and two voxels having the coincided layer of the point data from the clustering targets.

* * * * *